Nov. 29, 1960 E. C. KARNAVAS ET AL 2,962,058
APPARATUS FOR FORMING POINT CONTACTS FOR TRANSISTORS
Filed July 6, 1953 11 Sheets-Sheet 4
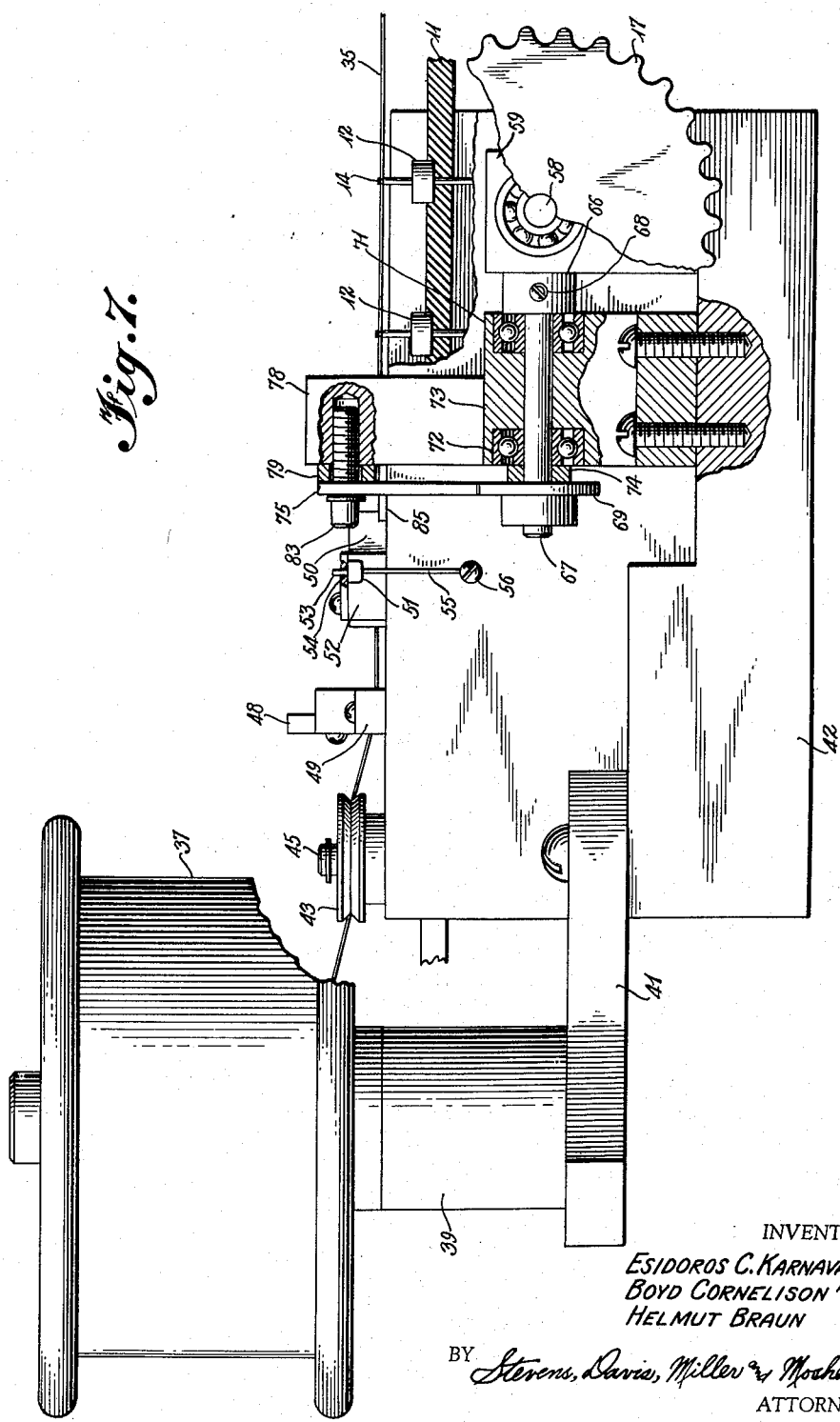
INVENTORS
ESIDOROS C. KARNAVAS,
BOYD CORNELISON AND
HELMUT BRAUN
BY *Stevens, Davis, Miller & Mosher*
ATTORNEYS

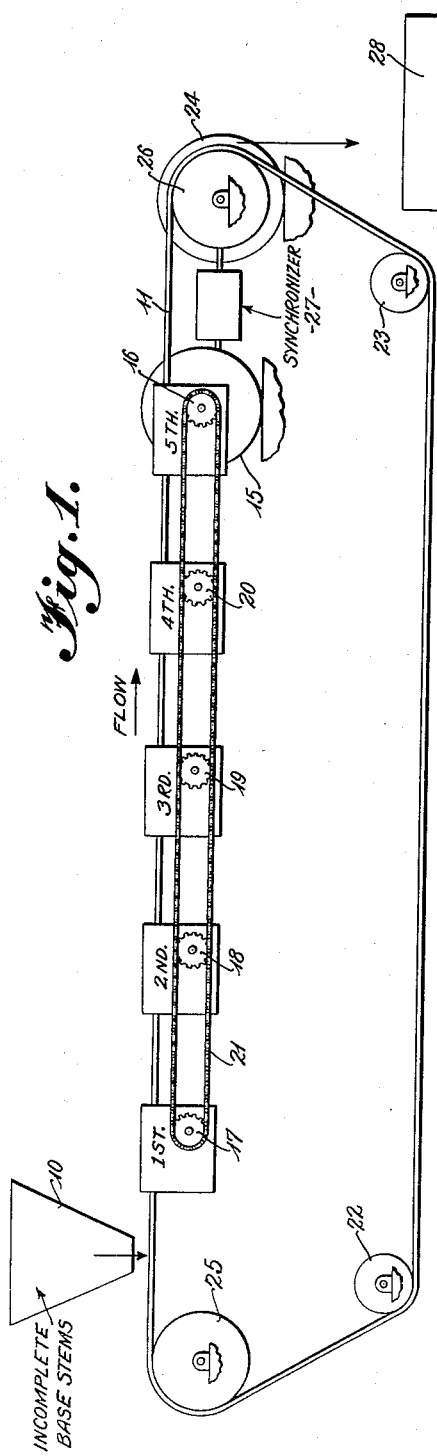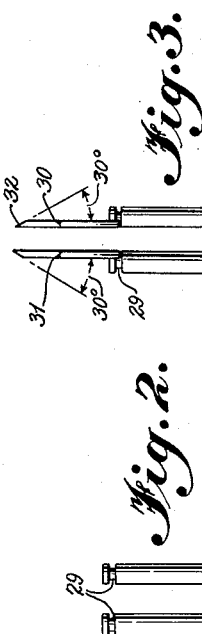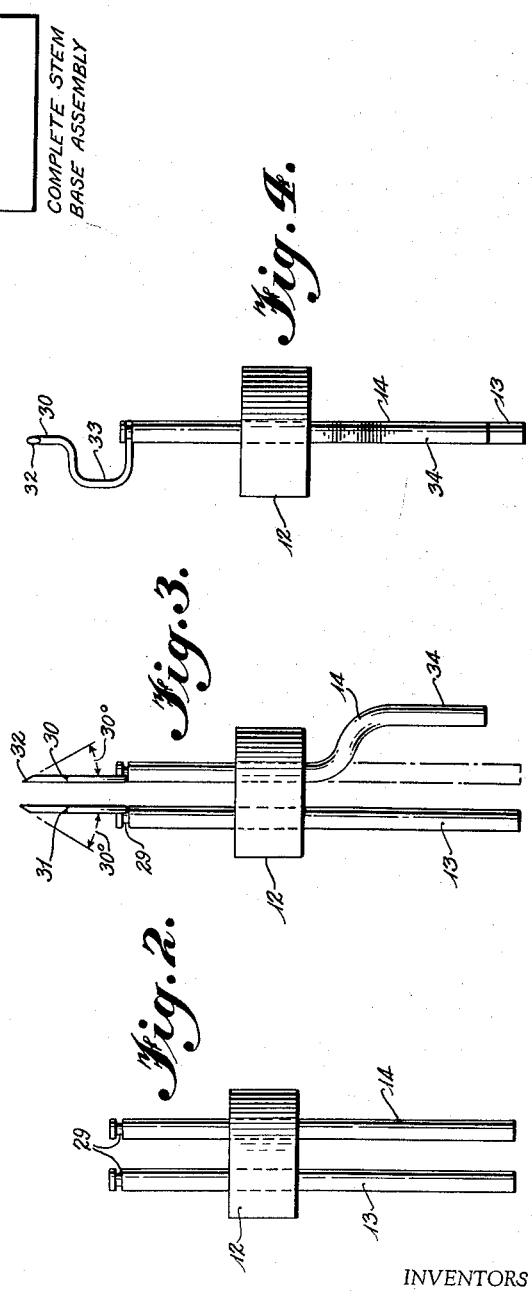

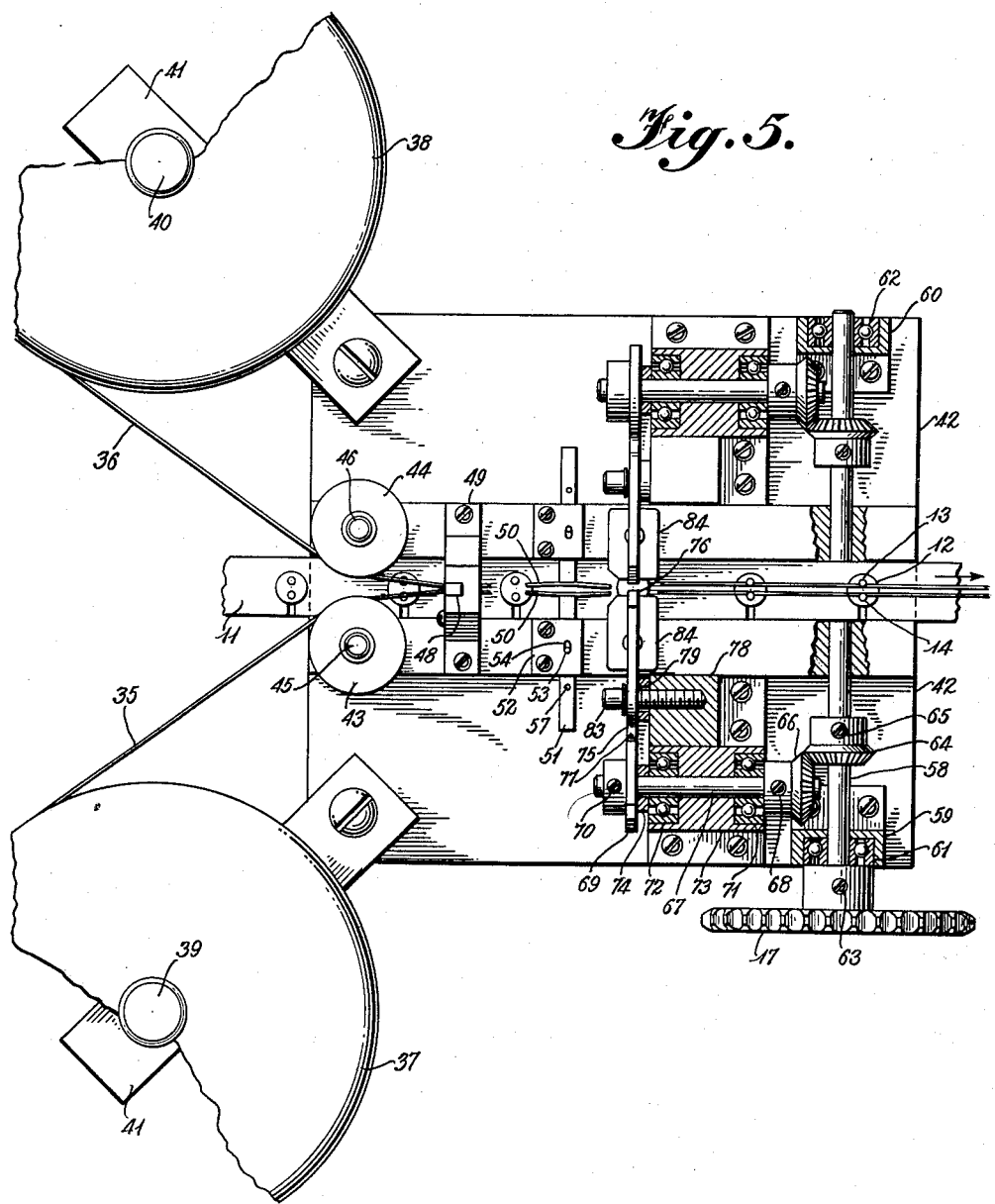

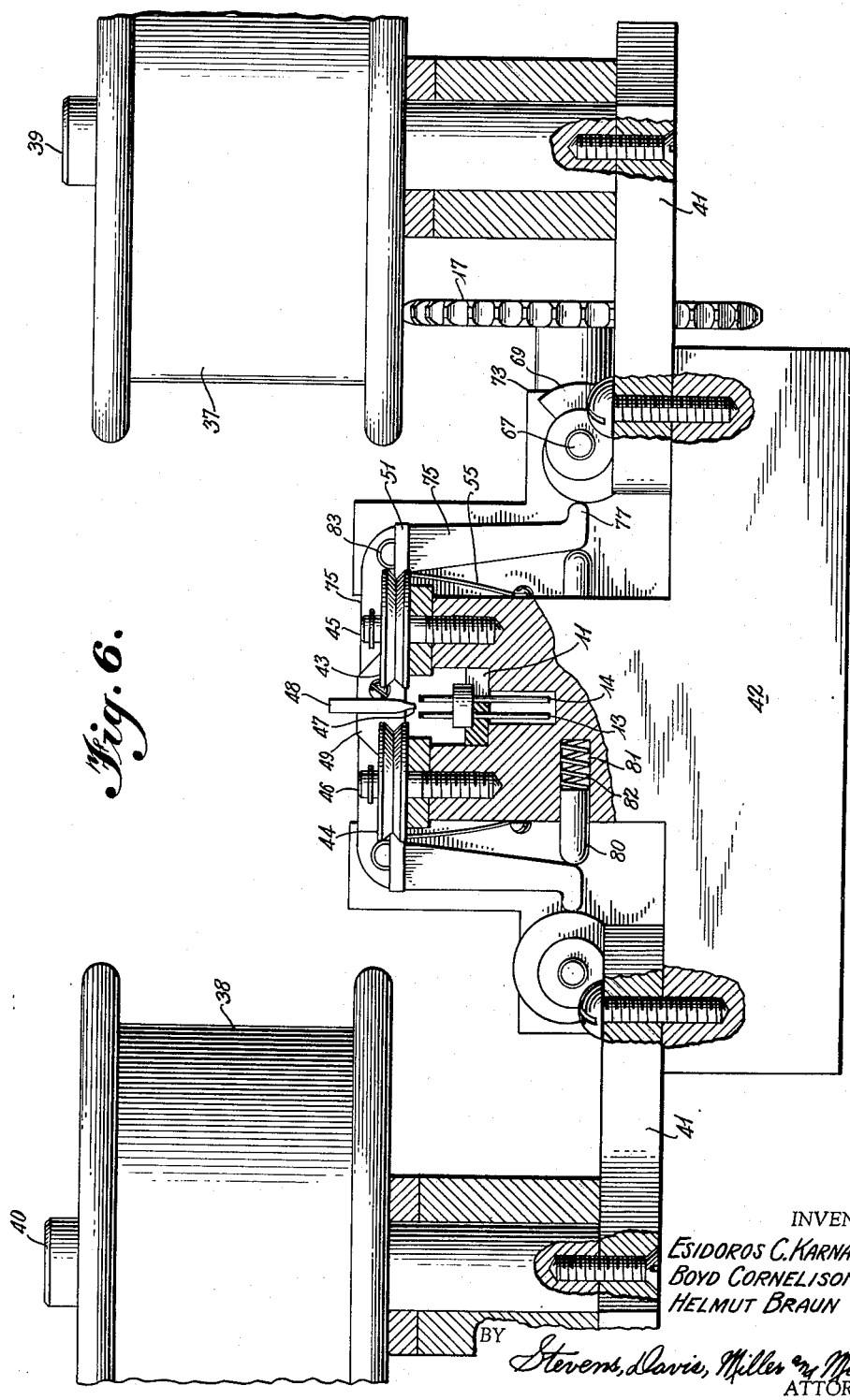

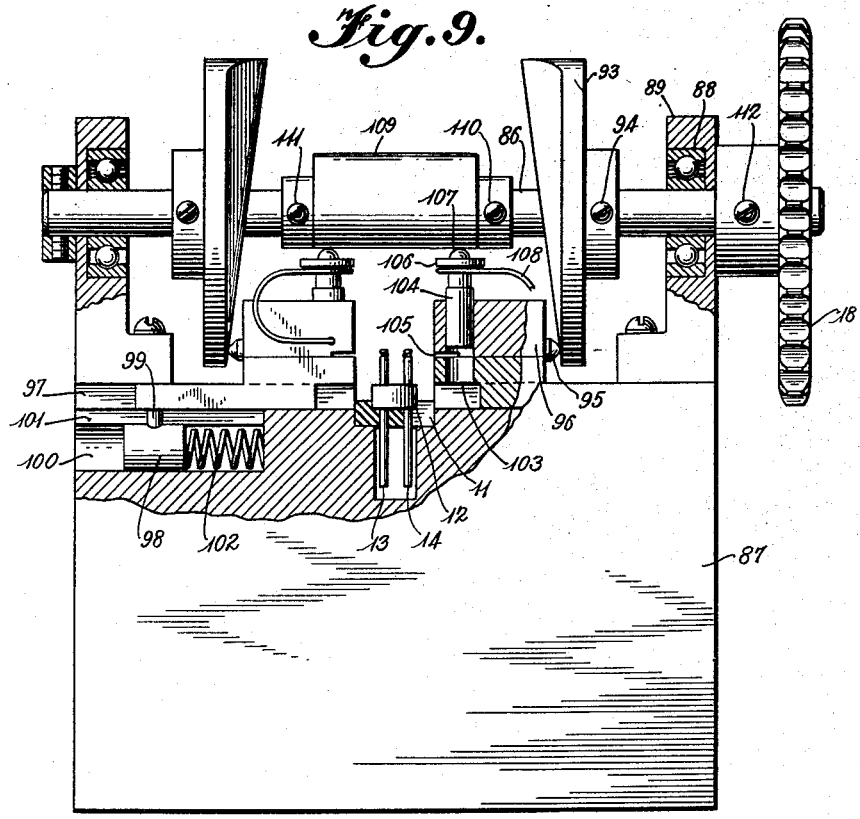
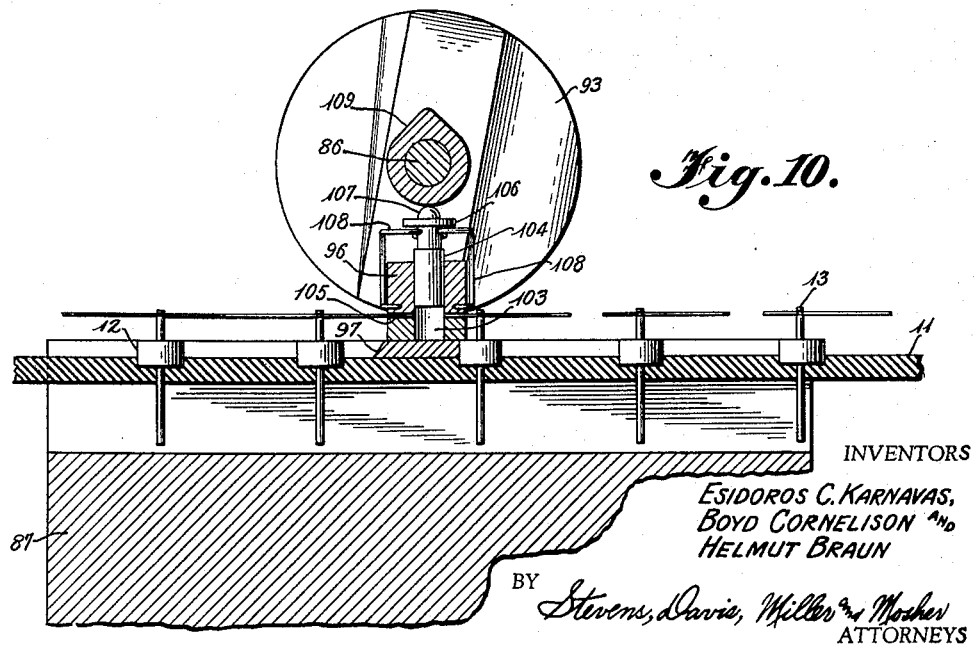

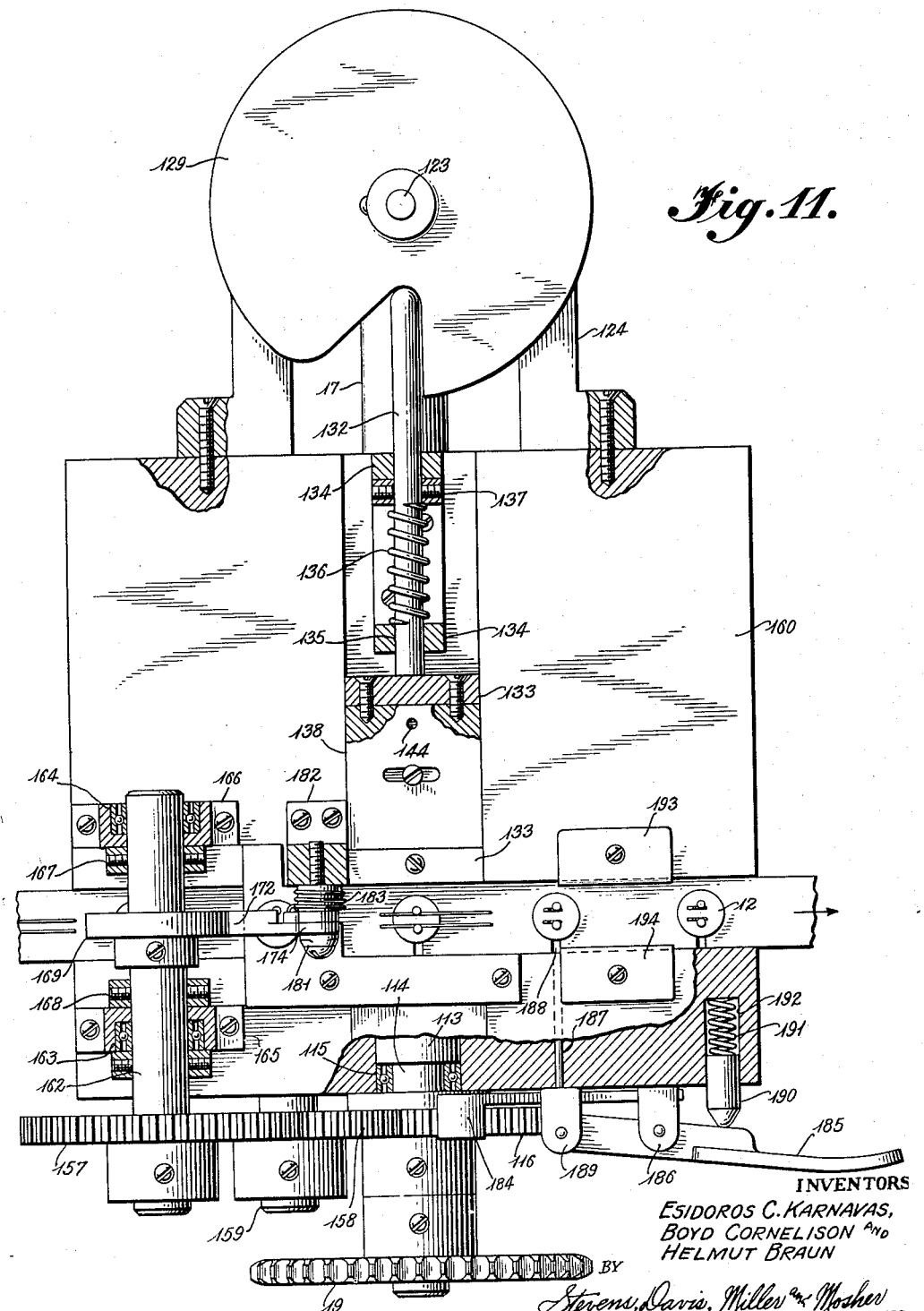

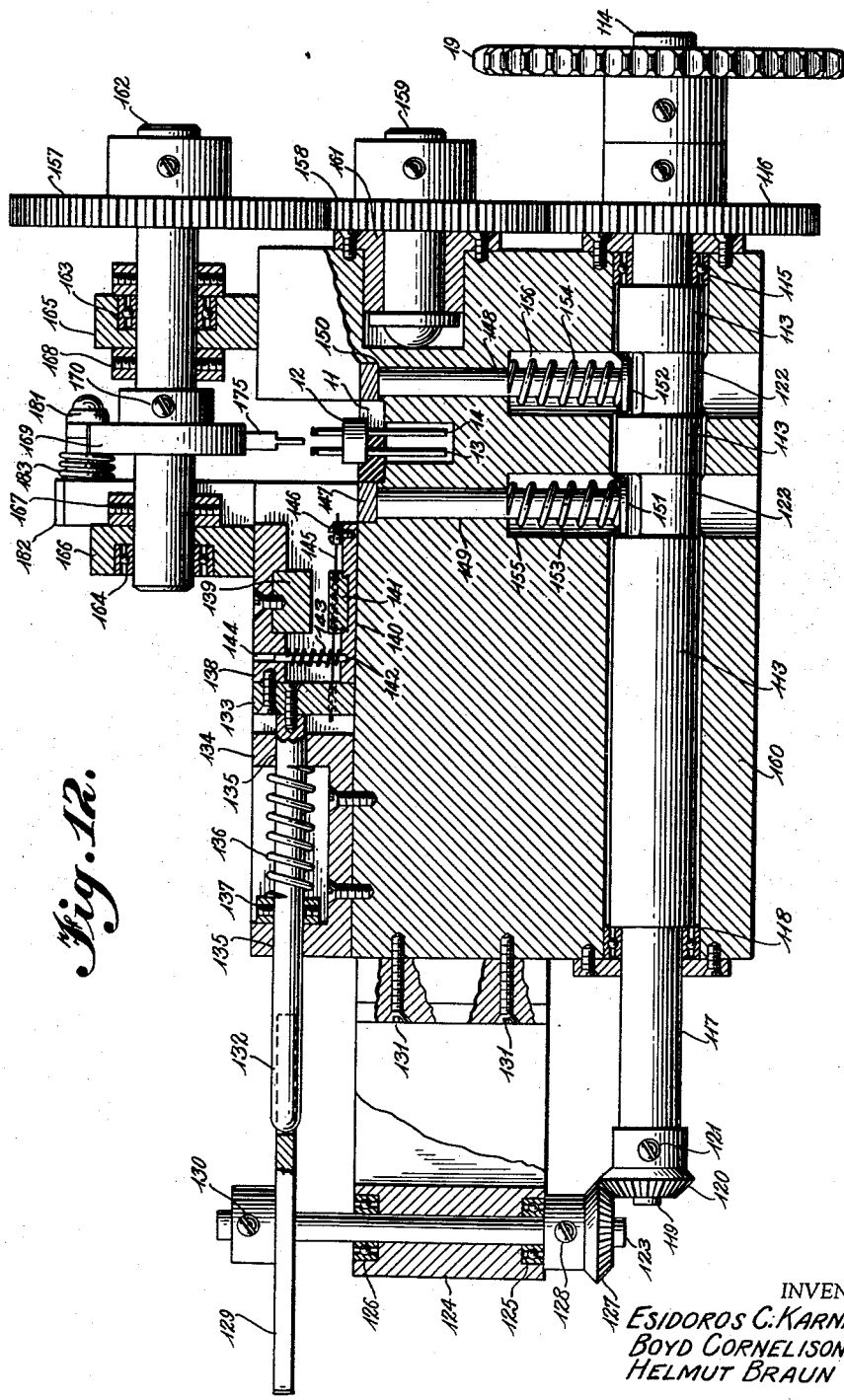

Nov. 29, 1960  E. C. KARNAVAS ET AL  2,962,058
APPARATUS FOR FORMING POINT CONTACTS FOR TRANSISTORS
Filed July 6, 1953  11 Sheets-Sheet 9
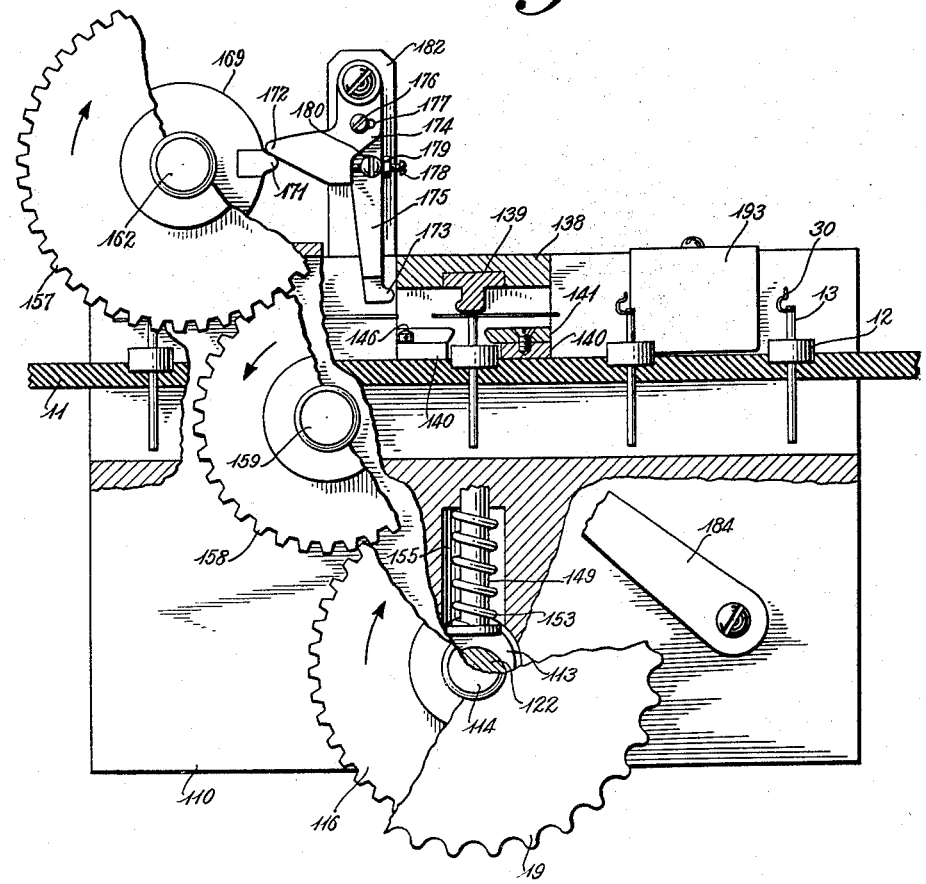
INVENTORS
ESIDOROS C. KARNAVAS,
BOYD CORNELISON AND
HELMUT BRAUN
BY Stevens, Davis, Miller and Mosher
ATTORNEYS Nov. 29, 1960     E. C. KARNAVAS ET AL     2,962,058
APPARATUS FOR FORMING POINT CONTACTS FOR TRANSISTORS
Filed July 6, 1953     11 Sheets-Sheet 10
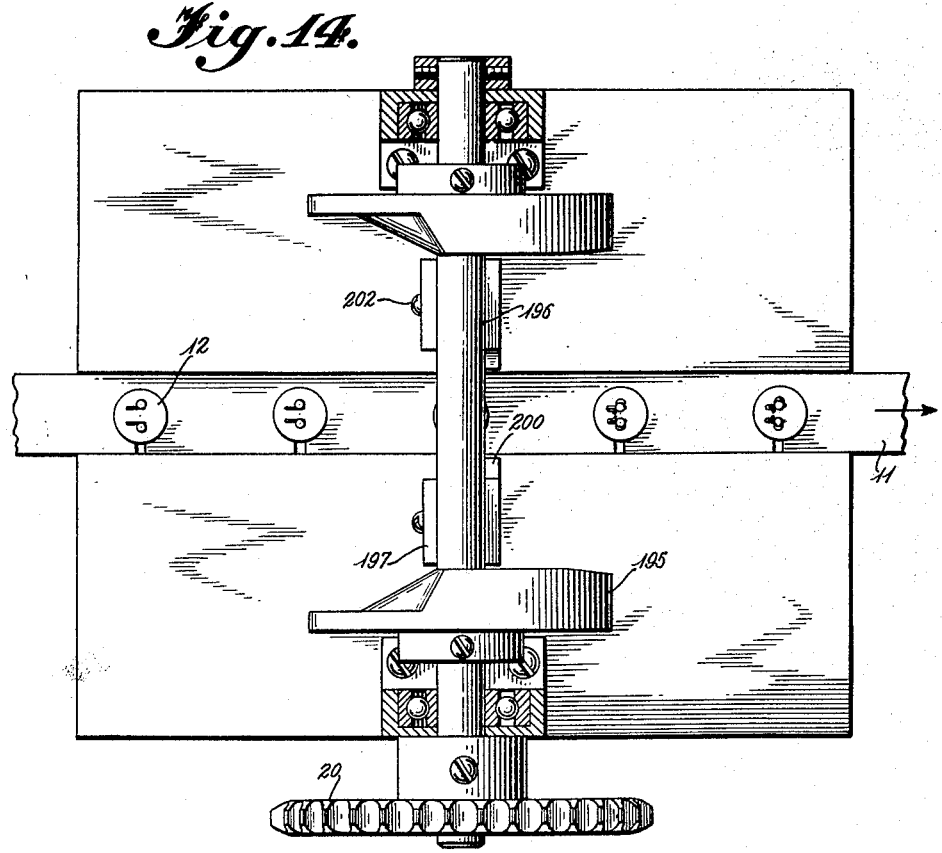
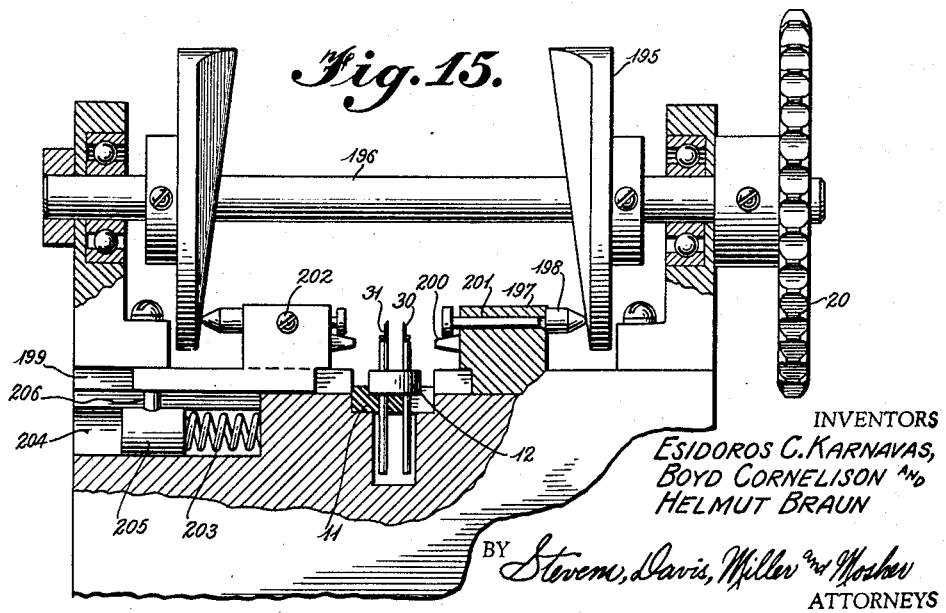
INVENTORS
ESIDOROS C. KARNAVAS,
BOYD CORNELISON AND
HELMUT BRAUN
BY Stevens, Davis, Miller and Mosher
ATTORNEYS

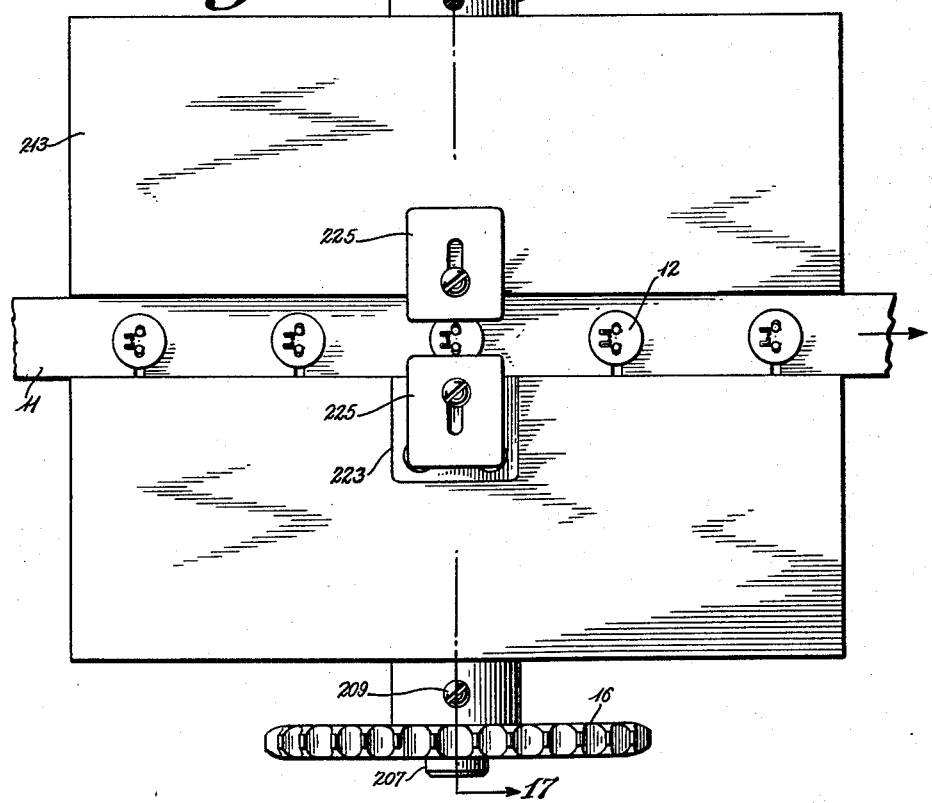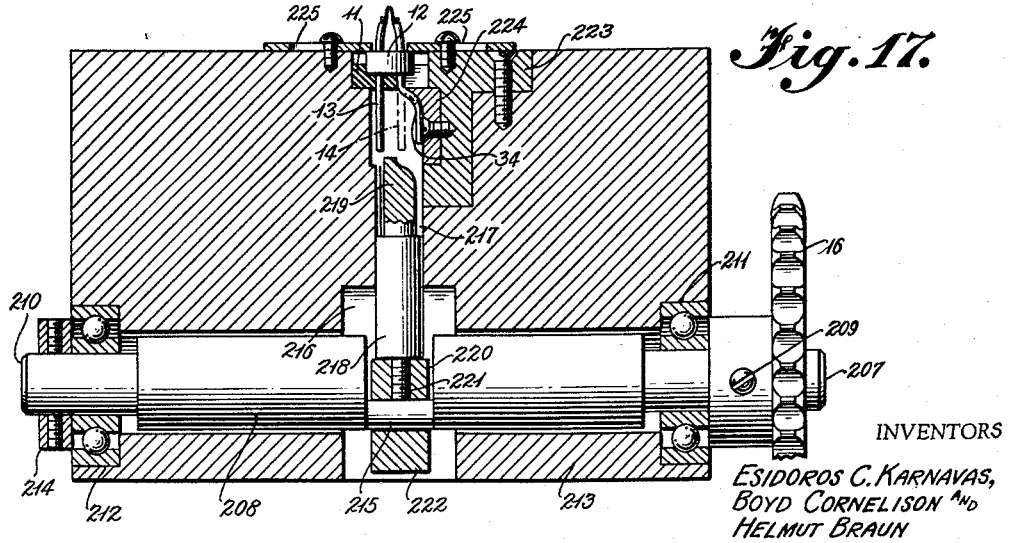

United States Patent Office 2,962,058
Patented Nov. 29, 1960

2,962,058

APPARATUS FOR FORMING POINT CONTACTS FOR TRANSISTORS

Esidoros C. Karnavas, Boyd Cornelison, and Helmut Braun, Dallas, Tex., assignors to Texas Instruments Incorporated, Dallas, Tex., a corporation of Delaware Filed July 6, 1953, Ser. No. 366,202

2 Claims. (Cl. 140—71.5)

This invention relates to a method and apparatus for forming point contacts for transistors and more particularly to a method and apparatus for the continuous production as well as individual stage fabrication for fabricating emitter and collector electrodes for use in a point contact transistor.

The point contact transistor consists basically of a wafer of semiconductor material, usually an N-type germanium, and three electrodes called the emitter, collector and base electrodes. The emitter and collector electrodes are fabricated with very sharp points on their ends and with a U-shape bend to act as a spring. These two electrodes are placed very close together and in contact with one side of the germanium wafer. The base electrode is soldered, connected, or placed in contact with the opposite side of the wafer. The N-type material directly underneath the point contacts can be formed into P-type areas by passing currents into these areas during manufacture by a known method, such as the one disclosed in Patent No. 2,577,803 to Pfann, or by applying pressure to these areas. When sufficient pressure is applied to a germanium lattice structure, the lattice fractures and leaves "traps" or holes equivalent to the "holes" in the P-type germanium. This pressure is conventionally applied by the electrodes in assembling the transistor since the electrode points have such a small contact area that a very high pressure is created on a minute unit area underneath each point. The result is a PNP transistor.

As indicated above, the points of the emitter and collector electrodes are spaced closely together on the surface of the germanium wafer. Electrons travel much slower in a semiconductor than they do in a conductor and "holes" travel even more slowly than the electrons. As a comparison of the speeds at which a current is conducted, electrons in a conductor transfer current at approximately the speed of light or 186,000 miles per second but electrons in a semiconductor have a typical mobility value of 2600 centimeters per second per volt per centimeter and a "hole" mobility of 1700 centimeters per second per volt per centimeter. It can be seen from this great difference in the speed of current conduction that there is a finite transit time before the "holes" or electrons injected by the emitter reach the collector. Therefore, the spacing between the emitter and collector electrodes is a critical distance. The distance in dimension between the two depends upon the use intended for the point contact transistor. The distance between the electrodes is usually from .001" to .006" although in some cases, the distance may be less than .001" and as large as .02" or more. The use intended for the transistor will determine the spacing required as the larger electrode spacings would be completely unsuitable for high frequency operation whereas they could be used for either low frequency work or pulsing.

The critical steps in producing an operable point contact transistor, outside of the semiconductor wafer itself, center around the emitter and collector electrodes. These steps consist of cutting the end points, forming the bend, and spacing the electrodes to the optimum distance. The components that support the electrodes in contact with the germanium wafer are also carefully cut and formed, but this is due to the size and arrangement of the transistor rather than the criticality of spacing, etc., as in the case of the electrodes.

One satisfactory means for supporting the electrode wires has been found to be by stems of a substantially greater diameter than the electrode wires and grooved at their upper ends. The grooves receive the wires and are then peened or bent down to firmly bond them in place. An insulating base is formed around the stems in a manner to leave a pre-determined length of stem on either side. The stems below the base are appropriately formed to fit into a standardized transistor socket. Several separate and individual steps are required to prepare and complete this assembly for insertion into the transistor case and consequently the electrode wires into contact with the germanium wafer. The various steps in forming this assembly have heretofore been performed by hand operations in conjunction with jigs and fixtures. This method of forming the point contacts has resulted in low production, low efficiency and lack of uniformity in the completed product.

It is, accordingly, the purpose of this invention to provide a method and apparatus for fabricating the emitter and collector electrodes for use in a point contact transistor and shaping the collector electrode stem for insertion into a standardized socket. More specifically, the purpose of this invention is to provide a method and apparatus consisting of five stages or steps for attaching the point contact wires to the portion of the stem above the base, cutting the point contact wires and forming the points in the same operation, forming the U-shaped spring bend in the electrode wires, adjusting the spacing between the stems and contact wires and bending and forming the collector electrode stem.

It is an object of this invention to provide a novel process for the continuous production of point contact transistor components by proceeding successively from one stage to the next and to produce completed components after passing through all five stages.

It is another object of this invention to provide fabrication stages which can operate independently and which are capable of performing their fabricating operations when not in the line of continuous production.

As the spacing between the emitter and collector electrodes is critical and as this distance determines the various uses of the point contact transistor, it is a further object to provide in one of the stages an adjustable means to provide the desired spacing.

Still another object is to manufacture a more uniform product by a more efficient method than has been possible with the methods used heretofore.

Other and further objects and features of this invention will appear more clearly and fully from the following description and from the drawings in which:

Figure 1 is a schematic diagram showing the five stage method for fabricating point contact components;

Figure 2 is a view in elevation of a blank used in the method shown in Figure 1;

Figure 3 is a view in front elevation showing a completed point contact component;

Figure 4 is a view in side elevation of the component;

Figure 5 is a view in top plan of the apparatus used in stage one;

Figure 6 is a view in side elevation partly broken away of the apparatus shown in Figure 5;

Figure 7 is a view in end elevation partly broken away of the apparatus shown in Figure 5;

Figure 9 is a view in end elevation partly broken away of the apparatus shown in Figure 8;

Figure 10 is a view in vertical section of Figure 8 taken along line 10—10;

Figure 11 is a view in top plan partly broken away showing the apparatus used in stage three;

Figure 12 is a view in end elevation partly broken away of the apparatus shown in Figure 11;

Figure 13 is a view in side elevation partly broken away of the apparatus shown in Figure 11;

Figure 14 is a view in top plan showing the apparatus used in stage four;

Figure 15 is a view in end elevation partly broken away of the apparatus shown in Figure 14;

Figure 16 is a view in top plan showing the apparatus used in stage five; and

Figure 17 is a view in vertical section of Figure 16 taken along line 17—17.

Figure 8:
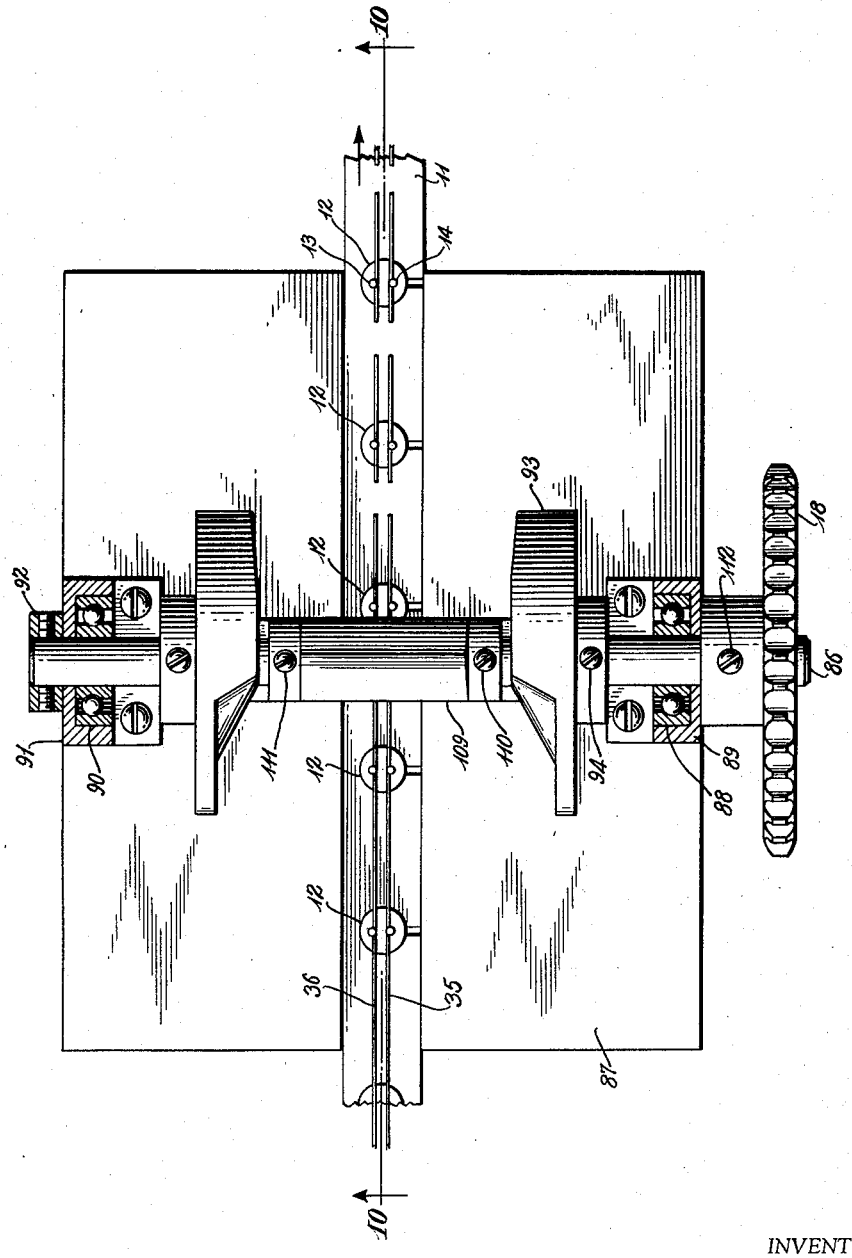
Figure 8 is a view in top plan showing the apparatus used in stage two.

Referring now to the drawings, Figure 1 shows in schematic form the five stages of the process arranged for continuous production of point contact components. The stem bases (Figure 2) prior to fabrication are placed in a container or hopper 10 for feeding to conveyor 11. Conveyor 11 is formed with a series of equally spaced holes countersunk to receive stem base 12 and drilled with one hole in the countersunk area to receive stem 13 and slotted perpendicular to the axis of the conveyor to receive stem 14. Power drive 15 is directly connected to sprocket 16 of the fifth stage, although it would operate satisfactorily if attached to any of the sprockets of the other stages such as 17, 18, 19 or 20. The sprockets of all five stages are directly connected by chain drive 21. Hence, as power drive 15 makes one complete revolution, all five stages perform a different step in the fabrication process simultaneously. Although a sprocket and chain drive is indicated, any suitable directly connected drive can be used whereby all stages are operated simultaneously such as by gears and a continuous shaft, five worm gear drive. Conveyor 11 is represented as supported by pulleys 22, 23, 24 and 25. Drive 26, connected to pulley 24, is synchronized with drive 15 through synchronizer 27 to move conveyor 11 a distance equal to the spacing between the stem bases so that each stem base is in position for a step in the fabrication process before drive 15 completes another revolution. The completed components are represented as being transferred from conveyor 11 to container 28.

Figure 2 illustrates the stem base before the process of fabrication is begun and consists of a circular insulating base 12 cast around stems 13 and 14 so that a definite length of each stem extends above and below the base. The upper ends of stems 13 and 14 are formed with circular grooves 29 to receive the electrode wires. As used in the following description, the stem diameter is .032" and the diameter of the electrode wire is .005". The wires and stems, however, are not to be considered as limited to only these dimensions.

Figures 3 and 4 represent the stem base assembly after it has passed through the process of fabrication. After fabrication, electrode wires 30 and 31 have been attached in grooves 29, pointed as at 32, formed with a U-shaped bend at 33, and stem 14 has been formed to take shape 34. As used in this invention, stem base is defined to mean the base and stems before fabrication while stem base assembly is defined to mean the stems, base and electrode wires after fabrication.

Referring now in greater detail to the five stages comprising the present invention, the apparatus used in the first stage is illustrated in Figures 5, 6 and 7. The point contact or electrode wires 35 and 36 are wound on reels 37 and 38, the reels being supported by and rotating on shafts 39 and 40 attached through arms 41 to the base structure 42. Reels 37 and 38 are supported sufficiently high to feed, even from the bottom of the reel, the wire at an angle downward to wire guide spools 43 and 44. Spools 43 and 44 rotate on shafts 45 and 46, respectively, which are fixed to base structure 42. From the spools 43 and 44, the wires again angle downwardly and pass through a horizontal slot 47 in bar 48. Bar 48 is supported by block 49 to hold slot 47 at the same height above conveyor 11 as grooves 29 in stems 13 and 14. The purpose of the difference in height between slot 47 and reels 37 and 38 is to provide clearance for stems 13 and 14 to pass underneath and outside of wires 35 and 36 since it is necessary for the wires to be located on the inside of the stems. The width of bar 48 must be smaller than the spacing between the stems 13 and 14 and as a consequence, wires 35 and 36 are not in contact with grooves 29 after feeding through slot 47.

Two spring loaded concave leaves 50 are used to force the wires into grooves 29. As the mechanism is the same for both wires, only a description for wire 35 is given. Leaf 50 is fastened at its upper edge to bar 51 which is supported by and rides in a rectangular groove in bar support 52. Guide pin 53, fastened to bar 51, extends through guide slot 54 in support 52. The lower end of cantilever spring 55 is fixed to base structure 42 by screw 56 and the other end extends through hole 57 in bar 51. As stem 14 contacts and rides over the concave surface of leaf 50, the leaf assembly moves forward against the pressure of spring 55 and this pressure forces wire 35 into groove 29. After stem 14 passes leaf 50, spring 55 returns the leaf assembly to its rear position and thus maintains the pressure on wire 35 until it can be firmly fixed in groove 29.

The purpose of this first stage is to firmly attach the point contact wires to stems 13 and 14. Since the method is identical for attaching each wire to its stem, the method will be described only for attaching wire 35 to stem 14. Main shaft 58 is supported above base structure 42 by bearing blocks 59 and 60 and roller bearings 61 and 62. Drive sprocket 17 fits over an extension of shaft 58 beyond bearing 61 and is fixed in position by set screw 63. Miter gear 64 is fixed to shaft 58 by set screw 65 and mates with miter gear 66, both miter gears having an equal number of teeth. Miter gear 66 is fastened on one end of cam shaft 67 by set screw 68 while bell crank hammer cam 69 is fastened on the other end by set screw 70. Cam shaft 67 rotates in ball bearings 71 and 72 which are mounted in block 73. Block 73 in turn is attached to base structure 42. Spacer ring 74 separates cam 69 from block 73. Bell crank hammer 75 is roughly L-shaped with hammer surface 76 formed on the end of one leg of the L and cam riding surface 77 formed at the end of the other leg. Bell crank 75 is supported from block 78 and separated by a spacer 79 equal in width to spacer 74. Plunger 80 moves in recessed area 81 in base structure 42 and is rounded to bear against one leg of bell crank hammer 75. Compression spring 82 is positioned in recessed area 81 to be compressed as plunger 80 is forced inwardly.

The operation of the above described apparatus and of stage one is as follows. As shaft 58 is turned by drive sprocket 17, cam shaft 67 is turned by the miter gears 64 and 66. Cam shaft 67 will turn one revolution for each revolution of shaft 58 because the two miter gears have an equal number of teeth. Cam 69 rotates with shaft 67 and causes cam riding surface 77 to turn bell crank hammer 75 on pin 83 and lift hammer surface 76. As the hammer surface 76 lifts, plunger 80 moves inwardly compressing spring 82. The rotation of cam 69 is synchronized with the movement of conveyor belt 11 so that as stem 14 arrives in position underneath hammer surface 76, cam riding surface 77 meets the drop-off point in cam 69 and bell crank hammer 75 is released. Spring 82 through plunger 80 then forces hammer surface 76 down in an arc to strike the edge of stem 14 and peen point contact wire 35 firmly in place in the groove 29. Buckle plates 84 and 85, positioned adjacent to stems 13 and 14, respectively, prevents the force of the peening action from buckling the stems.

The apparatus for the second stage in fabricating point contact components is illustrated in Figures 8, 9 and 10. Cam shaft 86 is supported above base structure 87 by roller bearing 88 and bearing block 89 at the front and by roller bearing 90 and bearing block 91 at the rear. Shaft 86 is prevented from moving axially by shaft retaining collar 92. There are two carriage operating cams mounted on cam shaft 86 but only the structure and function performed by one will be described as both are arranged and operate identically, but on different point contact wires. Carriage operating cam 93 is fixed in position on shaft 86 by set screw 94 and bears against carriage riding surface 95 fixed to carriage 96. Carriage 96 moves forward and back in a dovetail slot 97 formed in base structure 87. Circular bearing block 98 is directly connected to carriage 96 by rod 99 and the block and rod move in circular recessed area 100 and slot 101, respectively. Compression spring 102 is positioned in circular area 100 to be compressed as block 98 is moved forward. Carriage 96 is drilled with a hole 103 to receive shearing pin 104 and slotted at 105 to permit entry of point contact wire 35. Shearing pin 104 is slightly slanted on the shearing end and carries a retainer ring 106 and hemispherical riding surface 107 on its upper end. Spring 108 is looped underneath retainer ring 106 and the free ends are inserted into holes drilled in either side of carriage 96. Shearing pin cam 109 is mounted in the center of shaft 86 and fixed in position by set screws 110 and 111. Spring 108 maintains riding surface 107 in contact with shearing pin cam 109 at all times and is, consequently, under varying degrees of compression. Drive sprocket 18 fits over an extension of shaft 86 and is fixed in position by set screw 112.

The second stage performs its share in the fabrication process in the following manner. Conveyor 11 moves the stem base with the attached wire to a pre-determined distance beyond the effective cutting edge of the shearing pin. As the conveyor moves the stem base into position, drive sprocket 18 begins turning cam shaft 86 and thus carriage operating cam 93 and shearing pin cam 109. Cam 93, upon rotating against riding surface 95, moves carriage 96 forward until it reaches a point midway between stems 13 and 14. When carriage 96 is in the extended position, wire 35 has entered slot 105 in carriage 96 and is in position underneath shearing pin 104. Since spring 102 is compressed as the carriage moves forward, a push is exerted on the carriage against the action of cam 93. Cams 93 and 109 are so related that cam 109 does not depress shearing pin 104 until the carriage is in its most extended position; then, cam 109 depresses pin 104 and shears wire 35. As the cams rotate past their points of maximum travel, compression spring 102 pushes the carriage back from the conveyor and spring 108 restores the shearing pin to the up position. The position of wire 35 in area 103 is such that when contacted by shearing pin 104, a sharp point is formed on the wire by pin 104 severing wire 35 at approximately a 30° angle with respect to the long axis of wire 35. See Figure 3.

Since the wire is continuous between the stem bases as it enters stage two, shearing pin 104 forms a point and cuts the wire to a definite length for the stem base in position but leaves the next stem base in line with an unnecessary length of wire on each stem. Therefore, each stem base leaves stage two with a required length of wire on one side and an unnecessary length on the opposite side. The purpose of stage three is to form the wires cut to a definite length into a U-shape and to shear off the remaining excess wire. This forming and shearing action is accomplished by the use of three cams and their associated mechanisms as shown in Figures 11, 12 and 13. The operation and drive for this stage of operation is accomplished through main crank shaft 113. Shaft 113 is turned down into several sections with smaller diameters. One of these sections 114 is at the front of the apparatus and mounts ball bearing 115, gear 116, and drive sprocket 19. Ball bearing 115 supports the front end of the shaft in base structure 160. Both gear 116 and drive sprocket 19 are mounted on an extension of shaft 114 beyond the base structure and firmly attached by set screws. Another section 117 mounts ball bearing 118 at the rear of base structure 116 and supports the shaft at that point. At its extreme end, shaft 113 is turned down into a shaft with diameter of 119 and mounts miter gear 120. Set screw 121 attaches miter gear 120 to shaft 119. Toward the front of the apparatus, two sections 122 are formed with their center lines offset from the main center line of the shaft 113.

Die follower cam shaft 123 is mounted in substructure 124 by ball bearings 125 and 126, with miter gear 127 attached by set screw 128 at one end and die follower cam 129 attached at the other end by set screw 130. Gear 127 mates with gear 120. Substructure 124 is attached to base structure 160 by screws 131. Cam follower rod 132 engages the surface of cam 129 at one end and is screwed to the die carriage guide plate 133 at the other end. Rod 132 slides through and is supported by rod bearing block 134 at points 135. Compression spring 136 surrounds rod 132 within bearing block 134 and bears against the forward end of block 134 and against spring retaining collar 137, attached to rod 132. Upper die base 138 is fastened to guide plate 133 and mounts fixed upper die 139. Lower die base 140 moves with guide plate 133 and mounts movable lower die 144 in a dovetail slot. The lower die base is approximately U-shaped with the width of the U slightly greater than the width of fixed upper die 139. Both dies 139 and 141 are greater in width than the diameter of circular base 12. Pin 142, fixed to lower die base 140, is surrounded by spring 143, which bears against both upper and lower die bases. Hole 144 is formed in the upper die base 138, to receive pin 142. The restoring force for movable lower die 141 is provided by hairspring 145 which is fastened at one end to guide plate 133 and at the other end to bolt 146 and extends through a hole drilled in movable lower die 141. Bolt 146 is loosely and freely mounted in lower die base 140.

Die lifting bar 147 is fixed to lifting pins 148 and 149. In its lower position, die lifting bar 147 bears against, and is supported by base structure 160 at points 150. At the other end of pins 148 and 149 are retaining rings 151 and 152 respectively. Compression springs 153 and 154 surround the lower ends of pins 148 and 149 in the areas 155 and 156, and bear against the retaining rings and base structure. These springs keep die lifting bar 147 flush with the level of conveyor 11 when pins 148 and 149 are not in contact with eccentric sections 122. Gear 157 is connected to gear 116 through idler gear 158. Idler gear 158 is supported on shaft 159 which rotates in bushing 161 supported by the base structure 160. Shaft 162 supports gear 157 which rotates in ball bearings 163 and 164, which are mounted in blocks 165 and 166. Shaft retaining collars 167 and 168 prevent shaft 162 from moving axially. Cam 169 mounts on shaft 162 and is fixed against rotation by set screw 170. As cam 169 rotates, upset point 171 on cam 169 contacts point 172 of the movable die hammer, which causes point 173 of the movable die hammer to move against the movable lower die 141. The movable die hammer is composed of two legs 174 and 175 fixed to rotate as a unit by set screw 176 extending through slot 177 in leg 174 into leg 175. The relative position of the two legs is adjusted by bolt 178. Bolt 178 rides in nut 179 attached to leg 175 and bears against leg 174. Set screw 180 keeps adjusting bolt 178 from turning out of adjustment. The movable die hammer assembly is mounted on shaft 181, which in turn is supported by block 182. Torsion spring 183 is wound on shaft 181 with one end inserted into a hole drilled in block 182 and the other inserted into leg 175. Ratchet 184 rides on gear 116 and allows gear 116 to rotate only in a clockwise direction.

An indexing mechanism is shown in connection with stage three for providing a positive stop and a means to accurately locate conveyor 11 in position for the forming action. Although the mechanism is hand operated, as shown, it can be converted to automatic operation by attaching a solenoid to lever 185 and synchronizing its operation with the movement of the conveyor 11. Lever 185 turns about fulcrum point 186 which is at approximately the mid-point between a locating pin 187 and a restoring force. Locating pin 187 suitably sized to enter slotted section 188 in conveyor 11, is fixed to clip 189. Clip 189 is loosely fixed at one end of lever 185 to permit a slight degree of rotation. At the other end, plunger 190 and compression spring 191 are inserted into recessed area 192 and bear against the underside of lever 185. With this arrangement, pressure on lever 185 lifts pin 187 out of slot 188 but compresses spring 191 which acts to return the pin when pressure on the lever is released. Blocks 193 and 194 are mounted on the base structure 160 on either side of conveyor 11.

The sequence of operations, as stated before, depends on the interaction of three cams. Every part completes one cycle of operation with one revolution of the drive sprocket 19, since both miter gears 120 and 127 and gears 116 and 157 have the same pitch diameter. Idler gear 158 merely transmits power from gear 116 to gear 157. The sequence of operations for this stage is described in the following paragraph.

As the main crank shaft 113 is driven by drive sprocket 19, the motion is transmitted through the miter gears 120 and 127 to cam 129 which causes cam follower rod 132 to move the base die structure over the stem base and conveyor and at the same time to compress spring 136. The base die structure is composed of guide plate 133, fixed upper base die 138, lower base die 140 and their various components. The relation between cam 129 and eccentric cams 122 is that pins 148 and 149 are not contacted by cams 122 until the base die structure has moved over conveyor 11. Then eccentric cams 122 contact pins 148 and 149 and lift die lifting bar 147, which in turn lifts lower base die 140. Pin 142 and spring 143 act as a guide and restoring force, respectively, for the lower base die. The right hand section of the lower base die 140, assuming the drive sprocket side of the machine to be the front, contacts the right hand edge of fixed upper die 139 and shears the excess wires from the stems. The left hand side of lower base die contacts electrode wires 35 and 36 at the same time and bends them upwardly. At this point, cam 169 has been rotated until upset point 171 comes into contact with point 172 on leg 174 of the movable die hammer. Since both legs of the movable die hammer are rigidly connected together, leg 174 causes point 173 on leg 175 of the hammer to strike movable lower die 141. Movable lower die 141 mates with the left hand edge of fixed upper die 139 and as the two are brought together the point contact wires are bent into the required U-shape. The torsion in spring 183 is increased as point 171 moves the hammer, which restores the hammer to its original position after contact between points 171 and 172 has passed. As torsion spring 183 moves the hammer away, hairspring 145 can then restore the movable lower die to its original position. Cams 122, at this point, have rotated sufficiently to allow compression springs 153 and 154 to lower pins 148 and 149 and thus allows pin 142 and spring 143 to guide lower base die to the level of the conveyor. Cam 129 has then revolved to the drop-off point for follower rod 132 and spring 136 restores the base die structure to a point clear of the conveyor and stem bases.

The purpose of the fourth stage apparatus, shown in Figures 14 and 15, is to bend the stems 13 and 14 and the contact wires 30 and 31 until they are separated by the critical distance, which in this case is 0.005″±0.0005″. As stated previously, this distance can be adjusted to provide the desired operational characteristics for the transistor. The operation and form of this machine is practically identical with the apparatus used in stage two with a few minor exceptions.

As in the description of stage two, the structure and operation of this machine will be described for one side only since both sides are identical. Bending die cam 195, which is fastened to shaft 196, contacts bending die carriage 197 at point 198. Bending die carriage 197 is moved forward in dovetail slot 199 by the rotation of cam 195 until stem 14 is contacted by point 200 and wire 30 is contacted by the adjustable bolt 201. Bolt 201 is adjusted by set screw 202 and used to make the critical spacing between the point contact wires 30 and 31. Compression spring 203 in the recessed area 204 is compressed as carriage 197 moves forward by circular bearing block 205 which is connected to the carriage through rod 206. Spring 203 restores the carriage as cam 195 rotates from the point of maximum travel to the point of minimum travel. It will be noted that in stages two and four, identical structures are used to restore the carriages. Neither stage is limited to the type of spring shown since either torsion, tension, or compression springs can be used for the carriage restoring force by providing the appropriate structure.

The final stage in the fabrication process is performed by the apparatus shown in Figures 16 and 17. Figure 17 is a cross section of Figure 16 and illustrates the method of forming stem 14. Drive sprocket 16 is attached to section 207 of the main cam shaft 208 by set screw 209. Similar to stage three, the main cam shaft is turned down at both ends to a diameter shown by sections 207 and 210. The shaft is supported by ball bearings 211 and 212 within the base structure 213. Shaft retaining collar 214 mounts over section 210 and prevents axial movement of the shaft. Cam 215 is turned down from shaft 208 with its center line off-set from the center line of the main shaft 208. The forming apparatus is located inside the base structure 213 in areas 216 and 217. The means for imparting an up-and-down movement to circular bar 218 is located in area 216 while bar 218 and male die 219 move in circular area 217. Upper bearing member 220 is fixed to bar 218 by bolt 221 and the lower bearing member 222 is joined to bearing member 220 by four screws not shown. The completed bearing member 220 and 222 is slotted transversely so that all eccentric movement of cam 215 takes place within the slot and only an up-and-down movement is transmitted to bar 218. Male die 219 is mounted on the upper end of bar 218. Die plate 223 is attached to base structure 213, while female die 224 is attached to the die plate. Pin support plates 225 are fastened into the base structure and hold stem base 12 in place against any upthrust forces.

As drive sprocket 16 rotates shaft 208, cam 215 moves the bar and movable male die upward between the lower portions of the stems 13 and 14. Stem 14 rides down the curved portion of male die 219 and is forced against the fixed female die 224. On completion of the cycle, stem 14 is formed as shown by 34, Figure 3, and male die 219 is returned to its lower position through the positive bearing connection. The stem base assembly is complete after this operation and ready for assembly with the remainder of the point contact transistor components.

There are many forms in which this invention can be practiced. Instead of being used as a continuous process through all five stages as disclosed, fabrication can proceed independently through one stage at a time. Or, instead of power-driven means, hand operated cranks can be used. The invention is not intended to be limited to the exact form disclosed, but any means by which the same functions can be accomplished and that would occur to anyone skilled in the art, are within the scope and spirit of this invention.

What is claimed is:

1. Apparatus for forming a point contact component that comprises means to feed blanks successively past a point, each of said blanks consisting of a base, two grooved stems held therein in a manner to project above and below said base, and a wire from parallel supply wires secured to the groove of each of said stems with a predetermined length on one side of said stem, means at said point to cut-off said wires even with the other side of said stems and to form the remaining length of wire into a substantially U-shape.

2. Apparatus as defined in claim 1 wherein said means to cut-off wires and to form the remaining lengths includes a pair of cooperating dies, one of said dies backing up both the wires extended from both sides of the stems and including a cutting edge and a preforming edge, and the other die including a forming edge adapted to move transverse to the movement of the first die and into contact with the wire to be formed while the first die remains in its back-up position against the wire.

References Cited in the file of this patent

UNITED STATES PATENTS

| | | |
|---|---|---|
| 365,212 | Wilder | June 21, 1887 |
| 1,261,084 | Wilcox | Apr. 2, 1918 |
| 1,792,219 | Grebel | Feb. 10, 1931 |
| 1,849,680 | McKee | Mar. 15, 1932 |
| 2,280,573 | Flaws | Apr. 21, 1942 |
| 2,575,771 | Russell | Nov. 20, 1951 |
| 2,641,286 | Quinn et al. | June 9, 1953 |
| 2,646,609 | Heins | July 28, 1953 |
| 2,662,997 | Christensen | Dec. 15, 1953 |
| 2,677,173 | Fisler | May 4, 1954 |
| 2,711,791 | Bechard | June 28, 1955 |
| 2,732,614 | Shower | Jan. 31, 1956 |
| 2,744,574 | Fulger | May 8, 1956 |